US007788013B2

(12) United States Patent
Pruszenski

(10) Patent No.: US 7,788,013 B2
(45) Date of Patent: Aug. 31, 2010

(54) TECHNIQUES FOR REMOTELY ADJUSTING A PORTION OF AN AIRPLANE ENGINE

(75) Inventor: Anthony Stanley Pruszenski, Georgetown, MA (US)

(73) Assignee: Textron System Corporation, Wilmington, MA (US)

( * ) Notice: Subject to any disclaimer, the term of this patent is extended or adjusted under 35 U.S.C. 154(b) by 1093 days.

(21) Appl. No.: 11/480,612

(22) Filed: Jul. 3, 2006

(65) Prior Publication Data

US 2008/0078861 A1 Apr. 3, 2008

(51) Int. Cl.
*G06F 19/00* (2006.01)
*G06G 7/70* (2006.01)

(52) U.S. Cl. .............................. 701/100; 701/1; 701/99

(58) Field of Classification Search ..................... 701/2, 701/3, 50, 69, 99, 102; 74/11, 15.6, 15.8, 74/15.63, 15.86, 88, 129; 180/53.6, 53.7, 180/53.61, 53.62; 244/182, 188, 195; 477/107, 477/111; 73/112.01
See application file for complete search history.

(56) References Cited

U.S. PATENT DOCUMENTS 2,806,458 A 9/1957 Mettetal
2,810,251 A * 10/1957 Shippey ...................... 56/17.1
3,618,407 A * 11/1971 Amelio .......................... 74/88
3,784,174 A 1/1974 Tamofsky
4,023,751 A * 5/1977 Richard .................... 244/23 C
4,183,341 A 1/1980 Eastman
5,299,765 A * 4/1994 Blechen ...................... 244/182
5,922,032 A * 7/1999 Modeen et al. ................ 701/3
6,092,013 A * 7/2000 Stelzle et al. ................. 701/50
6,173,225 B1 * 1/2001 Stelzle et al. ................. 701/50
6,205,385 B1 * 3/2001 Stelzle et al. ................. 701/50

FOREIGN PATENT DOCUMENTS

DE 376138 5/1923
EP 1619489 A1 1/2006

* cited by examiner

*Primary Examiner*—Khoi Tran
*Assistant Examiner*—Bhavesh V Amin
(74) *Attorney, Agent, or Firm*—BainwoodHuang

(57) ABSTRACT

A technique provides a remote adjustment to a portion of an airplane engine. The technique involves attaching a remote adjuster to the portion of the engine at a proximate location to the engine while the engine is not running. The portion is configured to receive a direct manual adjustment from a user while the engine is running and while the user is in direct physical contact with the portion. The technique further involves, after attaching the remote adjuster to the portion of the engine, supplying user input to the remote adjuster at a distal location to the engine to provide a remote adjustment to the portion of the engine through the remote adjuster in place of the direct manual adjustment from the user. The technique further involves, after supplying the user input to the remote adjuster, removing the remote adjuster from the portion of the engine.

20 Claims, 11 Drawing Sheets

TECHNIQUES FOR REMOTELY ADJUSTING A PORTION OF AN AIRPLANE ENGINE

BACKGROUND

Conventional airplane combustion engines which drive propellers generally require "tune-ups" on various occasions such as upon release from the factory, at regular maintenance intervals once placed in operation, and perhaps at other times. Such tune-ups typically involve making adjustments to particular operating characteristics of the airplane engines. For example, suppose that an airplane or engine manufacturer has just completed manufacture of an airplane or engine. Prior to releasing the engine to the customer, the manufacturer thoroughly calibrates, tests and inspects the engine to confirm that the engine properly operates. Along these lines, the manufacturer sets or modifies various operating parameters of the airplane engine such as the fuel mixture, the idle speed and the oil pressure, among other things.

To adjust an airplane engine's fuel mixture, a skilled technician typically exposes the carburetor or fuel injection section of the engine (e.g., by removing an engine cover or a panel of the airplane body which covers that section of the engine) so that the technician has hands-on access to the mechanical linkage responsible for controlling the fuel-air mixture as it passes into the combustion section of the engine. The technician then starts the engine and allows the engine to drive the propeller. While the engine drives the propeller (thus enabling the engine to drive the actual load), the technician is capable of manually adjusting a thumb wheel of the mechanical linkage to increase or decrease the richness of the fuel mixture in order to optimize engine performance. In particular, the technician places a hand over the mechanical linkage so that the technician's fingers firmly engage depressions of the thumb wheel. The technician then manually rotates the thumb wheel in either a first direction (e.g., clockwise) to increase the richness of the fuel mixture, or the opposite direction (e.g., counterclockwise) to decrease the richness of the fuel mixture.

The technician may modify other engine features in a similar manner (i.e., while in direct physical contact with the engine) while the engine is running and driving the propeller. For example, the technician may manually grasp and turn a second thumb-actuated component or use a wrench or screw driver (e.g., rotate a thumb wheel, a thumb screw, an adjustment bolt, etc.) to change the idle speed of the engine. Additionally, the technician may manually grasp and turn a third thumb-actuated component or wrench/screw-driver actuated component to change the oil pressure within the engine.

SUMMARY

Unfortunately, there are deficiencies to the above-described conventional approach to modifying operation of an airplane combustion engine. For example, in the above-described conventional approach, the technician must stand very close to the fast-moving propeller such as within one or two feet of the propeller. Such proximity is extremely hazardous (e.g., life-threatening) particularly due to the distracting air currents caused by the rotating propeller as well as due to difficulty in clearly seeing the propeller as it rapidly rotates. Accordingly, the above-described conventional approach requires the technician to risk life and limb.

In contrast to the above-described conventional approach to modifying operation of an airplane combustion engine, an improved technique is directed to providing a remote adjustment to a portion of an airplane engine (e.g., a carburetor of an airplane combustion engine) which involves attaching a remote adjuster to the portion of the airplane engine and providing a remote adjustment to the portion of the airplane engine using the remote adjuster (e.g., turning of a thumb wheel to modify the fuel-mixture using a mechanical/electric/hydraulic/pneumatic driven actuator). Such a technique enables a user to reside at a safer distance from the airplane engine and from other dangerously moving objects (e.g., a fast-moving propeller) while reliably adjusting the engine.

An embodiment is directed to a method for providing a remote adjustment to a portion of an airplane engine. The method includes attaching a remote adjuster to the portion of the airplane engine at a proximate location to the airplane engine while the airplane engine is not running. The portion is configured to receive a direct manual adjustment (or indirect adjustment) from a user while the airplane engine is running and while the user is in direct physical contact with the portion. The method further includes, after attaching the remote adjuster to the portion of the airplane engine, supplying user input to the remote adjuster at a distal location to the airplane engine to provide a remote adjustment to the portion of the airplane engine through the remote adjuster in place of the direct manual adjustment from the user. The method further includes, after supplying the user input to the remote adjuster, removing the remote adjuster from the portion of the airplane engine. Preferably, the user has the option with weight complexity, certification and weight penalties of leaving the adjuster attached to the engine.

In some arrangements, the remote adjuster includes (i) a driver which is configured to come into direct physical contact with the portion of the airplane engine upon attachment of the remote adjuster to the portion of the airplane engine, (ii) a controller which is configured to receive the user input, and (iii) a coupler which links the controller to the driver to convey the user input from the controller to the driver. Here, supplying the user input to the remote adjuster includes applying the user input to the controller to remotely adjust the portion of the airplane engine from an initial setting to a new setting through the driver and the coupler.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved technique is directed to providing a remote adjustment to a portion of an airplane engine (e.g., a carburetor of an airplane combustion engine) which involves attaching a remote adjuster to the portion of the airplane engine and providing a remote adjustment to the portion of the airplane engine using the remote adjuster (e.g., a rotational adjustment of a thumb wheel to modify the fuel-mixture). Such a technique enables a user to reside at a safer distance (e.g., several feet) from the airplane engine and from other dangerously moving objects (e.g., a fast-moving propeller) while reliably adjusting the engine.

Figure 1A:
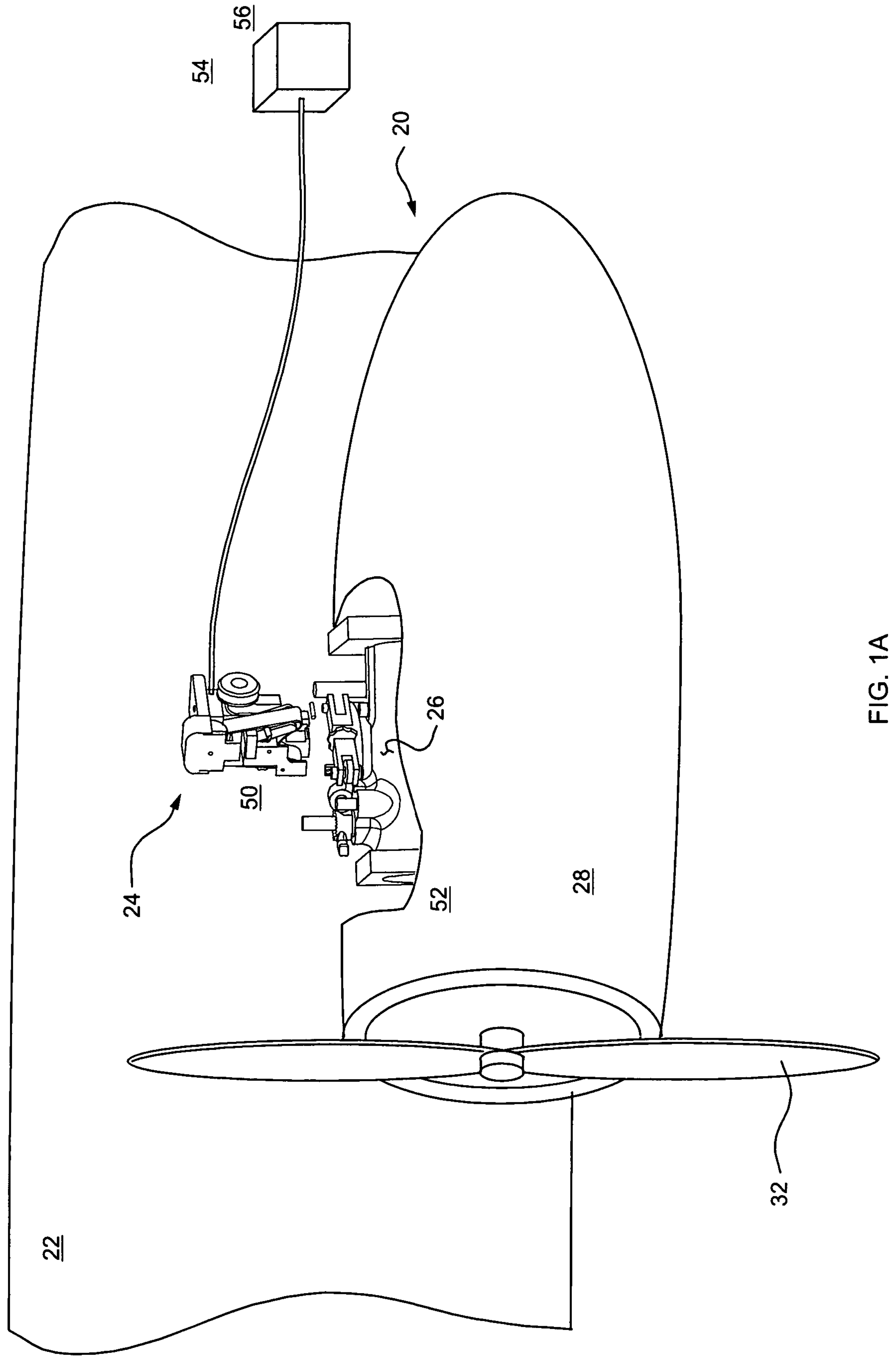
FIG. 1A is a perspective view of an airplane engine and a belt-based remote adjuster which is configured to provide a remote adjustment to a portion of the airplane engine.
Figure 1B:
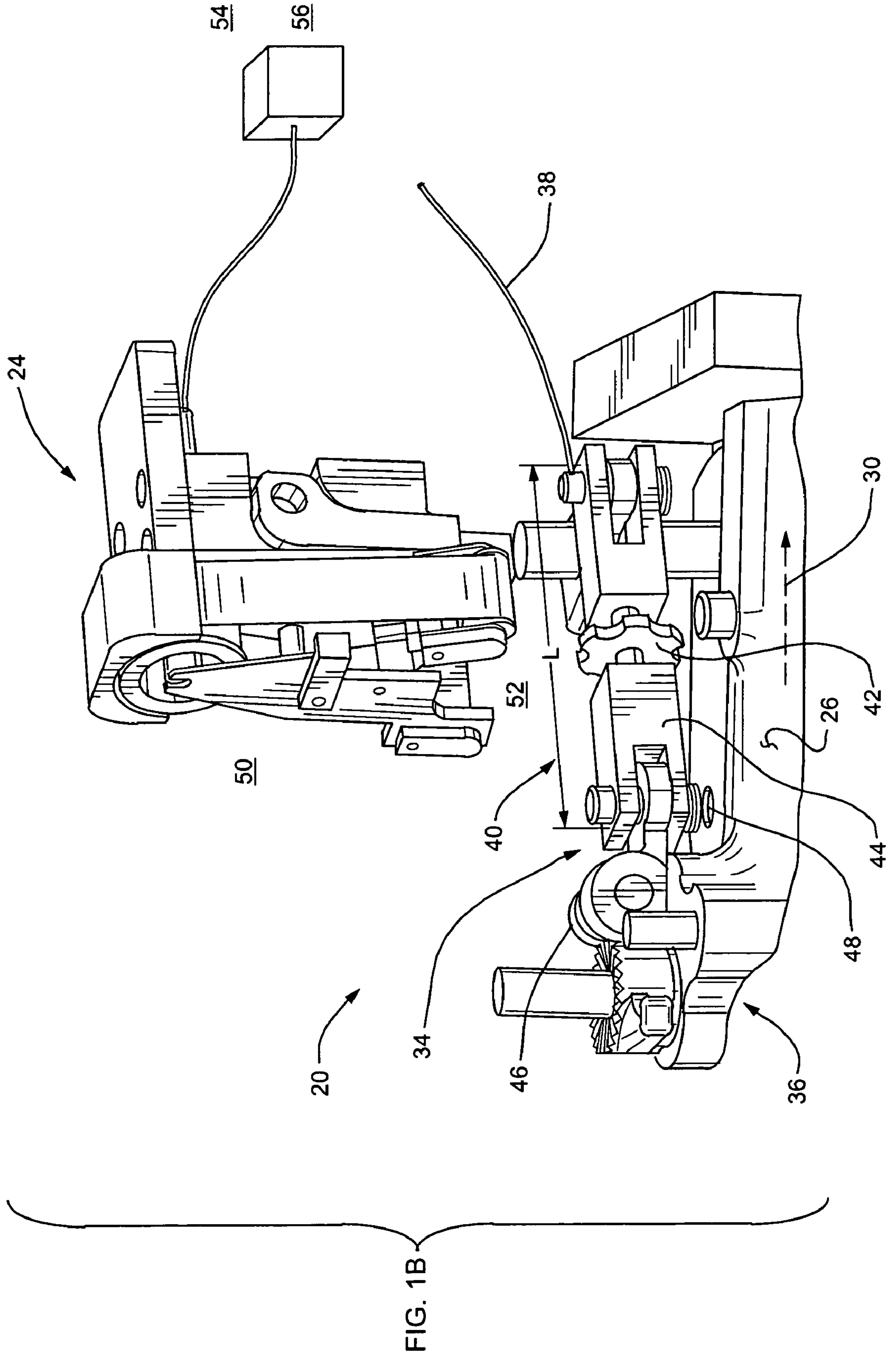
FIG. 1B is a close-up view of part of the airplane engine and the belt-based remote adjuster.

FIG. 1A shows an engine 20 for an airplane 22, and a remote adjuster 24 for providing remote adjustments to the engine 20. A portion of a wing and the fuselage of the airplane 22 are shown in a specific arrangement in FIG. 1A. It should be understood that other arrangements are suitable as well (e.g., where the airplane has two engines on each wing, where an airplane has one engine on its nose, etc.), and that the specific arrangement in FIG. 1A is provided by way of example and for illustration purposes only. FIG. 1B is a close-up view of the engine 20 and a portion of the belt-based remote adjuster 24.

The airplane engine 20 includes, among other things, a fuel-mixing portion 26 (e.g., a carburetor) and a combustion and drive portion 28 (FIG. 1A). During operation of the airplane engine 20, the fuel-mixing portion 26 combines air and airplane fuel into a combustible mixture 30 (e.g., vaporized fuel). The combustion and drive portion 28 then compresses and ignites the combustible mixture 30 to generate driving force on a load 32 (e.g., a propeller, as shown in FIG. 1A).

As shown in FIG. 1B, the fuel-mixing portion 26 of the airplane engine 20 includes mechanical linkage 34 which controls a throttle 36 (shown generally in FIG. 1B by reference numeral 36). A control line 38 extends from the mechanical linkage 34 to another area of the airplane 22 (e.g., a pilot compartment) to enable a pilot to set the position of the mechanical linkage 34 and thus actuate the throttle 36.

As further shown in FIG. 1B, the mechanical linkage 34 includes a compound screw 40 configured to define a length (L) of the mechanical linkage 34 thus controlling the precise orientation of the throttle 36 at various settings of the control line 38 in order to fine tune the richness of the combustible mixture 30. The compound screw 40 includes a thumb wheel 42 and a receiving screw 44 (e.g., a block with an internal thread) configured to receive the thumb wheel 42. The thumb wheel 42 is configured to rotate relative to the receiving screw 44 and thus offer a variety of different threaded displacements to enable the user to change the length (L) of the mechanical linkage 34. To this end, the compound screw 40 is configured to receive a direct manual adjustment from a user while the user's hand is in direct physical contact with the compound screw 40. In particular, if the user's hand rotates the thumb wheel 42 in a first direction (e.g., clockwise), the length (L) of the mechanical linkage 34 changes (e.g., grows) to increase the richness of the combustible mixture 30. In contrast, if the user's hand rotates the thumb wheel 42 in a second direction which is opposite the first direction (e.g., counterclockwise), the length (L) of the mechanical linkage 34 changes (e.g., shrinks) to decrease the richness of the combustible mixture 30.

It should be understood that the airplane engine 20 includes other thumb controlled members which operate in a manner similar to that of the compound screw 40. For example, the fuel-mixing portion 26 further includes a set screw 46 which controls the idle speed of the airplane engine 20, the set screw 46 being configured to receive a direct manual adjustment from a user's hand (e.g., thumb actuation) or a hand held tool (e.g., a wrench or a screw driver). As another example, the fuel-mixing portion 26 further includes a member 48 which controls the oil pressure of the airplane engine 20, the member 48 also being configured to receive a direct manual adjustment from a user's hand.

As further shown in FIGS. 1A and 1B, the remote adjuster 24 includes a first operative end 50 which is configured to attach to, and detach from, the fuel-mixing portion 26 at a proximate location 52 to the airplane engine 20. The remote adjuster 24 further includes a second operative end 54 which is configured to obtain user input (e.g., mechanical rotation of a cable, an electrical signal, etc.) at a distal location 56 to the airplane engine 20. Preferably, the proximate location 52 and the distal location 56 are separated by at least two feet (e.g., three feet, eight feet, 12 feet, etc.) to enable a user positioned at the distal location 56 to provide the user input at a relatively safe distance from the airplane engine 20 and the load 32.

During operation of the remote adjuster 24, the end 54 of the remote adjuster 24 receives input from the user, and the end 52 provides a remote adjustment to the fuel-mixing portion 26 of the airplane engine 20 in response to that input. This remote adjustment is capable of being provided in place of the direct manual adjustment and while the engine 20 is running thus alleviating the need for the user to be positioned dangerously close to the engine 20 or the moving load 32. Further details will now be provided with reference to FIG. 2.

Figure 2:
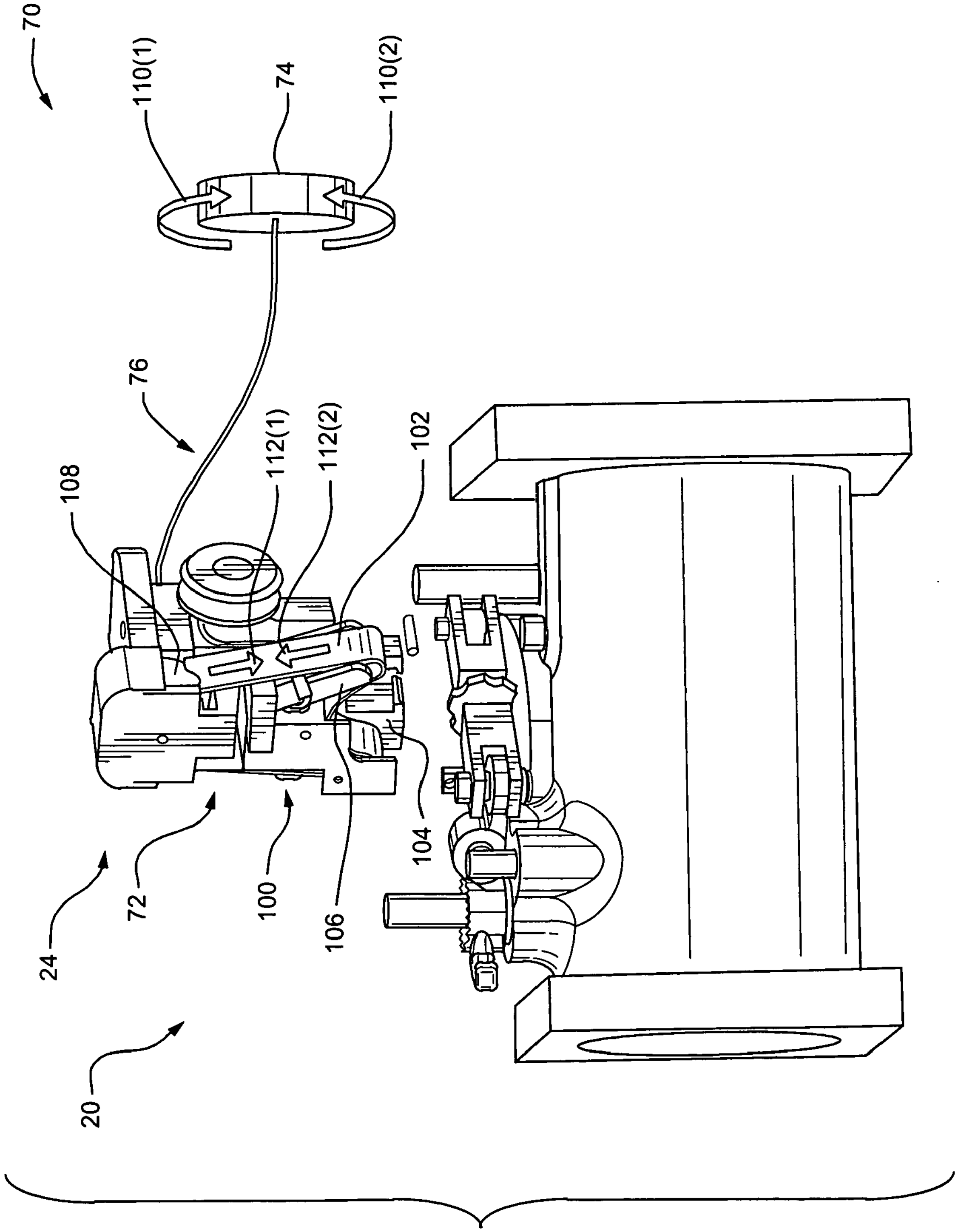
FIG. 2 is an exploded view of the belt-based remote adjuster of FIG. 1.

FIG. 2 is a partially exploded view 70 of the remote adjuster 24. As shown, the remote adjuster 24 includes a driver 72 which forms the first operative end 50 (also see FIG. 1). The driver 72 is configured to attach to, and detach from, the fuel-mixing portion 26 of the airplane engine 20. The remote adjuster 24 further includes a controller 74 which forms the second operative end 54 (also see FIG. 1), and a coupler 76 which links the controller 74 to the driver 72. The controller 74 is configured to receive the user input, and the coupler 76 is configured to convey that user input from the controller 74 to the driver 72. As explained earlier, such operation enables a user to remotely adjust the fuel-mixing portion 26 from an initial setting to a new setting while the engine is running and without needing to reside dangerously close to the engine 20 or the moving load 32.

As particularly shown in FIG. 2, the driver 72 is belt-based. That is, the driver 72 includes a pulley assembly 100 and a flexible belt 102 which is guided by the pulley assembly 100. The pulley assembly 100 includes a base 104 (e.g., a mount with a set screw), a set of guides 106 coupled to the base 104, and a drive roller 108 coupled to the base 104. During operation, the user rotates the controller 74 (e.g., a handle) which imparts rotation on the coupler 76 (e.g., a cable within a casing). The coupler 76, in turn, rotates the driver roller 108 to cause translation of the belt 102 within the set of guides 106. In particular, rotation of the controller 74 in a first direction 110(1) results in translation of the belt 102 in a direction 112(1). Furthermore, rotation of the controller 74 in a second direction 110(2) results in translation of the belt 102 in a direction 112(2) which is opposite the direction 112(1). Further details will now be provided with reference to FIG. 3.

Figure 3:
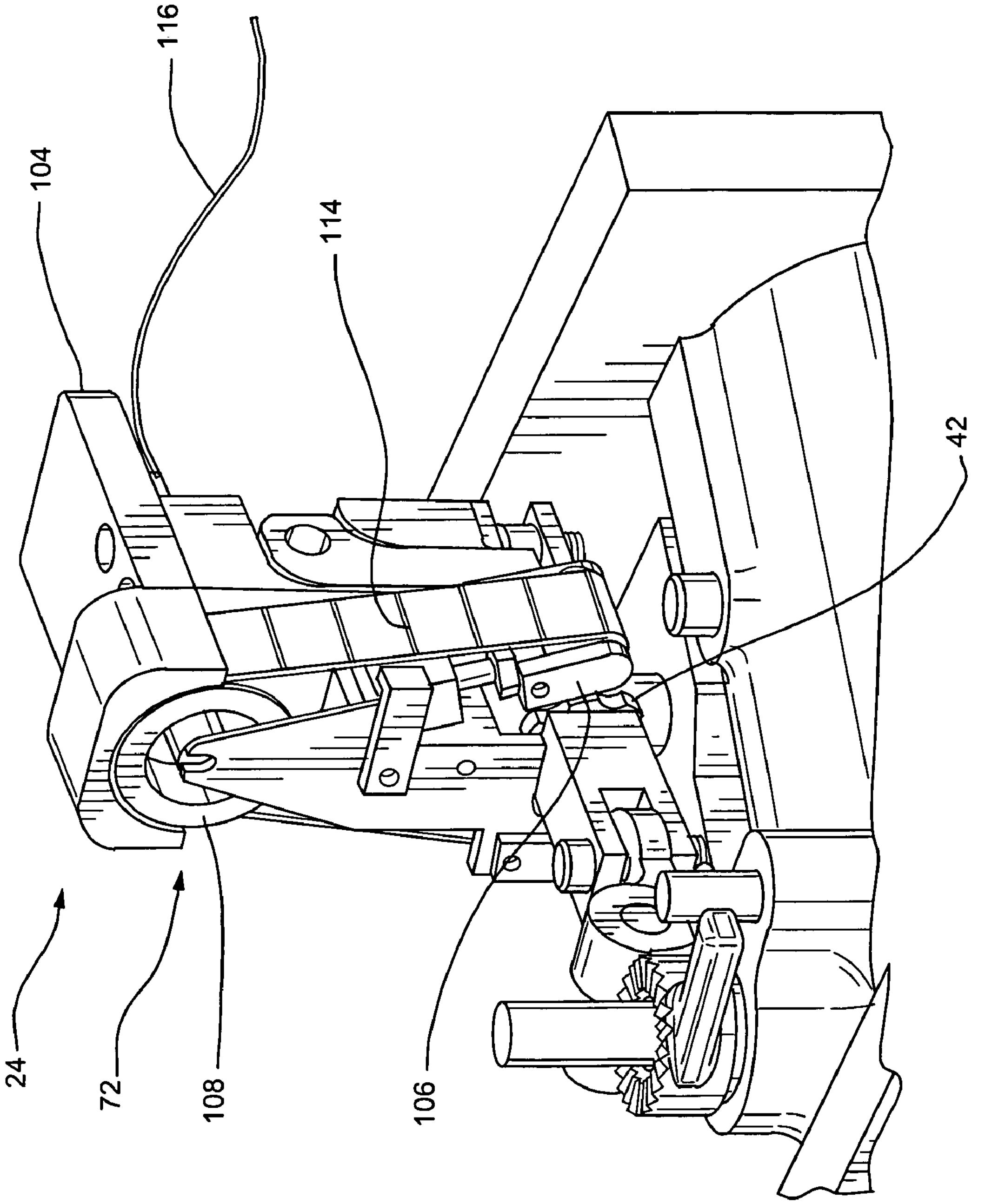
FIG. 3 is a detailed perspective view of a driver of the belt-based remote adjuster when attached to a thumb wheel.

FIG. 3 shows the driver 72 of the remote adjuster 24 when the driver 72 is attached to the mechanical linkage 34 of the engine 20. As shown, the base 104 of the pulley assembly 100 (also see FIG. 2) is configured to lock onto the mechanical linkage 34 (e.g., onto a block member of the mechanical linkage) so that the flexible belt 102 wraps around a section of the thumb wheel 42 to provide more than a single point of contact between the flexible belt 102 and the thumb wheel 42. Such enhanced contact enables the belt 102 to competently grip the thumb wheel 42 with minimal or no risk of slippage.

In some arrangements, the flexible belt 102 makes direct physical contact with substantially 50% or more of the circumference of the thumb wheel 42 of the mechanical linkage 34, as shown in FIG. 3. In some arrangements, the flexible belt 102 includes defined ribs 114 designed to catch within depressions of the thumb wheel 42 to improve engagement between the belt 102 and the thumb wheel 42.

It should be understood that the remote adjuster 24 alleviates the need to retrofit the mechanical linkage 34 of airplane engines 20. In particular, there is no need to replace the thumb wheel 42 with a different component that is more suitable for remote geared actuation (e.g., a gear). Such replacement could be extremely costly and time consuming since testing, and government approval and certification would likely be needed. In contrast, the remote adjuster 24 easily and conveniently grips onto the existing thumb wheel 42 even though the thumb wheel 42 was originally intended to receive a direct manual adjustment from a skilled technician while the airplane engine 20 is running. Accordingly, a user can remotely adjust the engine 20 without residing near the engine 20 and load 32 while the engine 20 is driving the load 32. That is, the user simply turns the controller 74 which turns a cable 116 of the coupler 76. The cable 116 conveys axial motion from the controller 74 to the pulley assembly 100 to move the flexible belt 102. As a result, the thumb wheel 42 turns relative to the receiving screw 44 to change the length (L) of the mechanical linkage 34 (FIG. 1B). Further details will now be provided with reference to FIG. 4.

Figure 4:
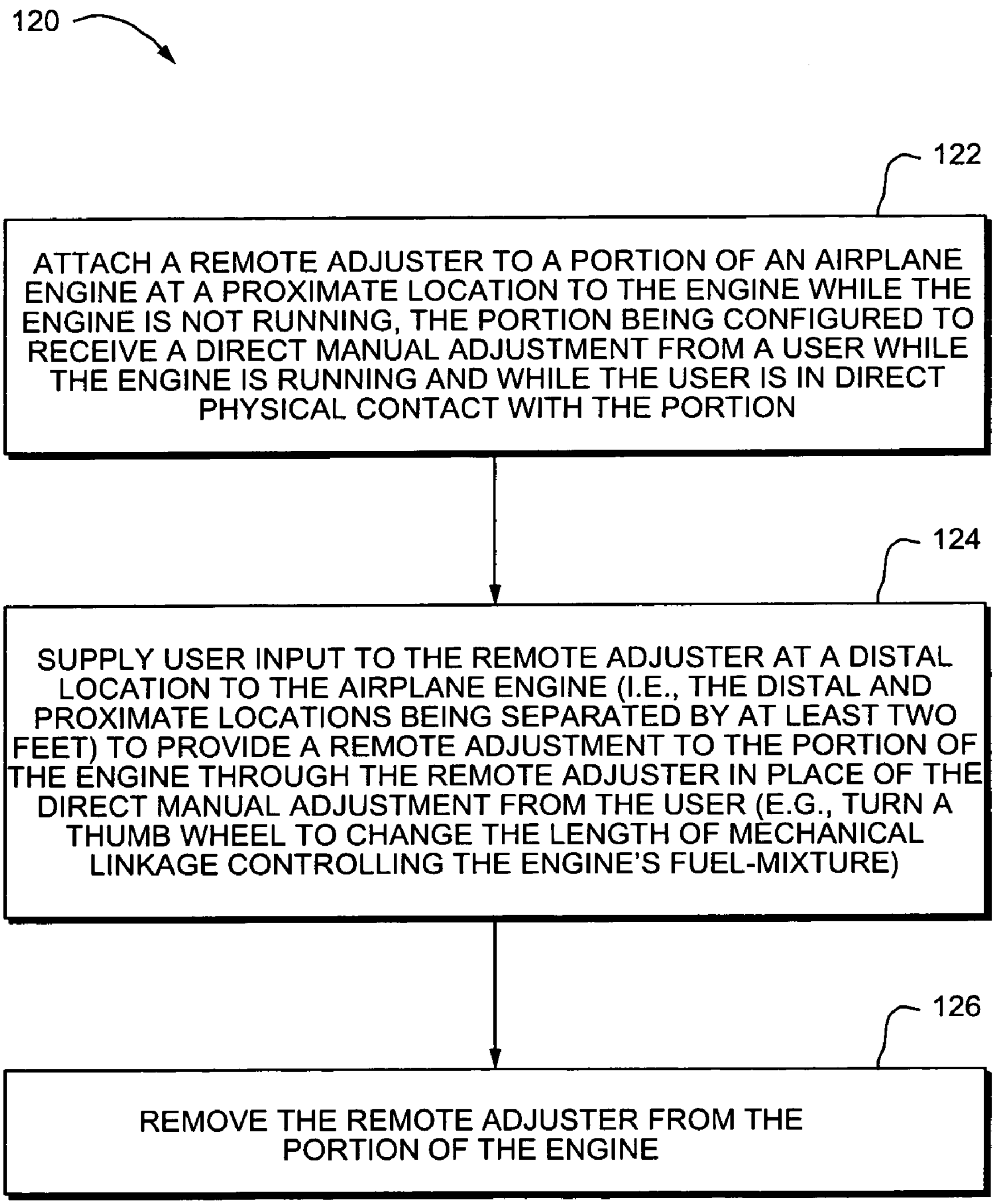
FIG. 4 is a flowchart of a procedure for remotely adjusting the portion of the airplane engine using the remote adjuster shown in FIGS. 1 through 4.

FIG. 4 is a flowchart of a procedure 120 which is performed by a user when remotely adjusting the fuel-mixing portion 26 of the airplane engine 20 using the remote adjuster 24. In step 122, while the airplane engine 20 is not running, the user attaches the remote adjuster 24 to the fuel-mixing portion 26 at the proximate location 52 (also see FIGS. 1B and 3). In particular, the user fastens the driver 72 to the mechanical linkage 34. Recall that the driver 72 is configured to come into direct physical contact with the thumb wheel 42 so that the user does not need to provide a direct manual adjustment. At this time, there is no danger to the user since the engine 20 and the load 32 (e.g., a propeller) are not moving. Following attachment of the remote adjuster 24, the user starts the airplane engine 20 and then can remain a safe distance (e.g., several feet) from the load 32 while the engine 20 is running.

In step 124, the user supplies input to the remote adjuster 24 at the distal location 56 (also see FIG. 1A) to provide a remote adjustment to the fuel-mixing portion 26 through the remote adjuster 24 in place of direct manual adjustment from the user. In particular, the user applies the user input to the controller 74 (e.g., mechanical rotation of a cable, an electrical signal, etc.) to remotely adjust the rotational position of the thumb wheel 42 relative to the receiving screw 44 (e.g., from a first rotational setting to a new setting) and thus modify the length (L) of the mechanical linkage 34 which controls the throttle 36. When the user is finished making remote adjustments to the engine 20, the user can turn off the engine 20, and safely return to the proximate location 52.

In step 126, the user removes the remote adjuster 24 from the fuel-mixing portion 26 while the engine 20 is off. Accordingly, the user has safely adjusted the fuel-mixing portion 26 without risking life and limb. Further details will now be provided with reference to FIG. 5.

Figure 5:
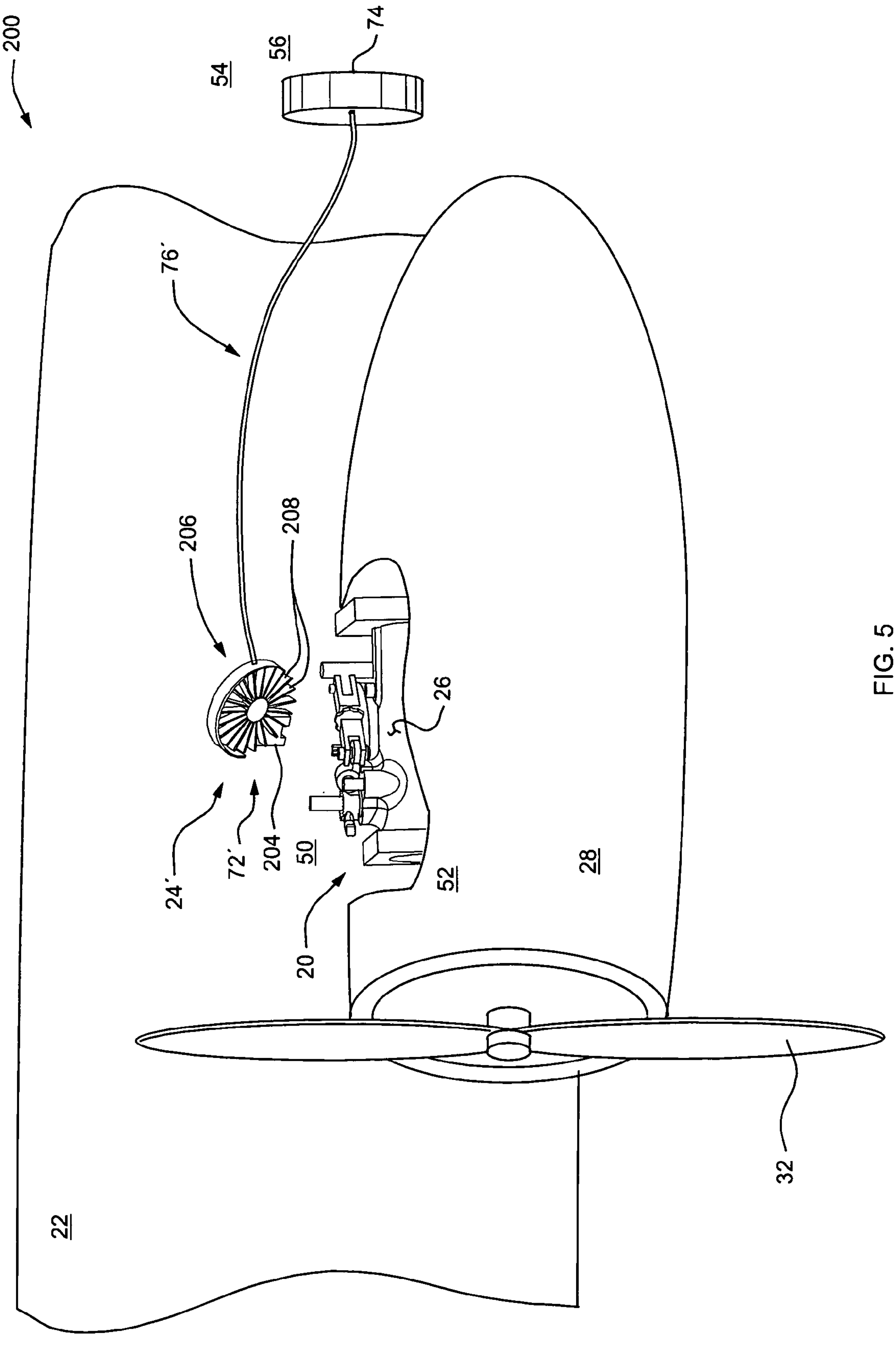
FIG. 5 is a perspective view of an airplane engine and a star-wheel-based remote adjuster which is configured to provide a remote adjustment to a portion of the airplane engine.

FIG. 5 is a perspective view 200 of the airplane engine 20 and a star-wheel-based remote adjuster 24' which is configured to provide a remote adjustment to the fuel-mixing portion 26 of the airplane engine 20. The star-wheel-based remote adjuster 24' is an alternative to the belt-based remote adjuster 24 described above in connection with FIGS. 2 and 3. The star-wheel-based remote adjuster 24' includes a driver 72' ,a controller 74' and a coupler 76' which operate in a manner similar to that of the driver 72, the controller 74 and the coupler 76 described above in connection with the belt-based remote adjuster 24. The driver 72' has a support assembly 204 and a star wheel 206 which is configured to rotate relative to the support assembly 204. The support assembly 204 is configured to fasten to a static location on the mechanical linkage 34 (e.g., a block member of the mechanical linkage 34). The star wheel 206 includes fingers 208 which are configured to respectively engage indentations of the thumb wheel 42 of the mechanical linkage 34 in a gear-like manner.

The controller 74' is configured to receive user input, and the coupler 76' is configured to convey that user input from the controller 74' to the star wheel 206. Accordingly, rotation of the controller 74' translates into rotation of the star wheel 206 relative to the support assembly 204. The rotation of the star wheel 206 turns the thumb wheel 42.

Figure 6:
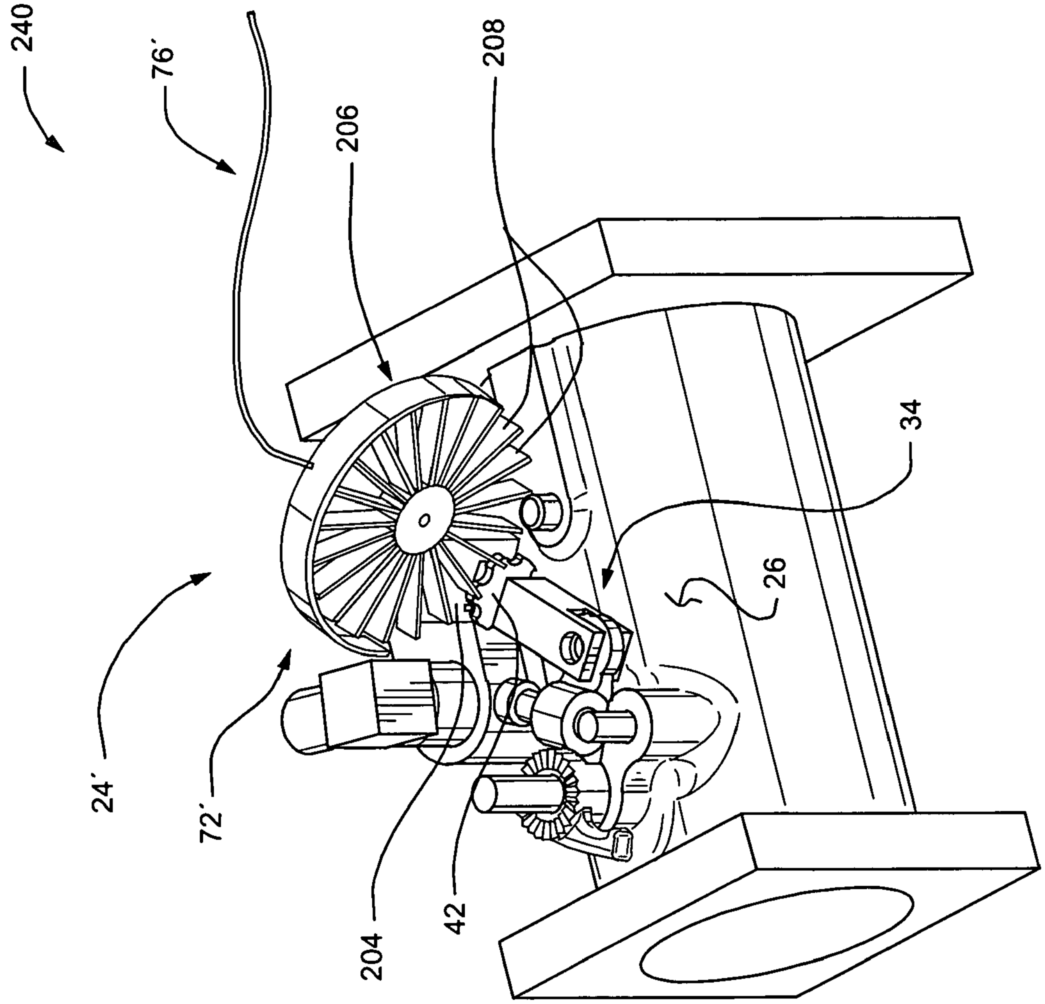
FIG. 6 is a detailed perspective view of a driver of the star-wheel-based remote adjuster when attached to a thumb wheel.

FIG. 6 is a detailed perspective view 240 of the driver 72' of the star-wheel-based remote adjuster 24' attached to the thumb wheel 42 of the mechanical linkage 34. As shown, the fingers 208 of the star wheel 206 interleave with the indentations of the thumb wheel 42 in standard gear-like fashion. As a result, when the user turns the controller 72' (e.g., a handle), the coupler 76' (e.g., a cable) conveys axial motion of the controller 72' to effectuate rotation of the star wheel 206. Turning of the star wheel 206 causes rotation of the thumb wheel 42 relative to the receiving screw 44 thus changing the overall length (L) of the mechanical linkage 34 (also refer to (L) as shown in FIG. 1B).

Preferably, the star wheel 206 is formed of a rigid but compliant material (e.g., steel, hard rubber, a polymer, etc.). Accordingly, although the indentations of the thumb wheel 42 may not form an involute, compliance of the star wheel 206 enables the ends of the fingers 208 of the star wheel 206 to effectively interface with the thumb wheel 42 (e.g., to provide constant contact between the star wheel 206 and the thumb wheel 42) and thus competently control positioning of the thumb wheel 42. Further details will now be provided with reference to FIG. 7.

Figure 7:
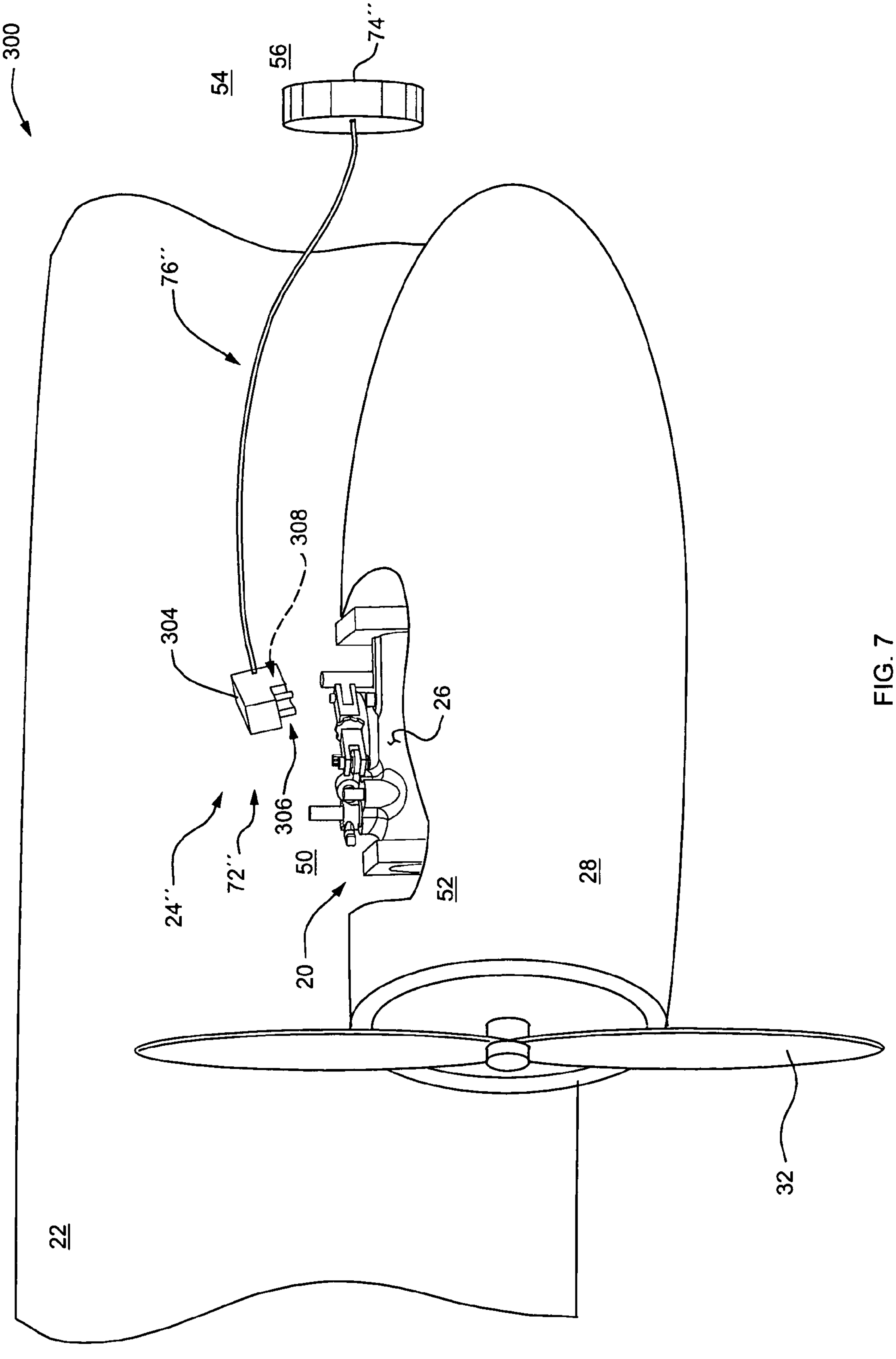
FIG. 7 is a perspective view of an airplane engine and a piston-based remote adjuster which is configured to provide a remote adjustment to a portion of the airplane engine.

FIG. 7 is a perspective view 300 of the airplane engine 20 and a piston-based remote adjuster 24" which is configured to provide a remote adjustment to the fuel-mixing portion 26 of the airplane engine 20. The remote adjuster 24" is an alternative to the belt-based remote adjuster 24 (FIGS. 2 and 3) and the star-wheel-based remote adjuster 24' (FIGS. 5 and 6). The piston-based remote adjuster 24" includes a driver 72", a controller 74" and a coupler 76" which operate in a manner similar to the drivers 72, 72', the controllers 74, 74' and the couplers 76, 76' described above. The driver 72" has a support assembly 304, a set of actuators 306 (one or more actuators) which is configured to actuate in a linear manner relative to the support assembly 304, and a set of piston members 308

(one or more piston members 308. The support assembly 304 is configured to fasten to a static location on the mechanical linkage 34. The set of actuators 306 (e.g., linear drivers) is configured to moves the set of piston members 308 so that the set of piston members 308 push onto indentations of the thumb wheel 42 of the mechanical linkage 34. Such plunger-like operation enables the set of actuators 306 to rotate the thumb wheel 42 (i.e., clockwise or counterclockwise) relative to the receiving screw 44.

The controller 74" is configured to receive user input, and the coupler 76" is configured to convey the user input from the controller 74" to the set of actuators 306. Accordingly, such user input translates into linear displacement of the set of piston members 308 causing rotation of the thumb wheel 42 relative to the receiving screw 44 thus changing the overall length (L) of the mechanical linkage 34.

Figure 8:
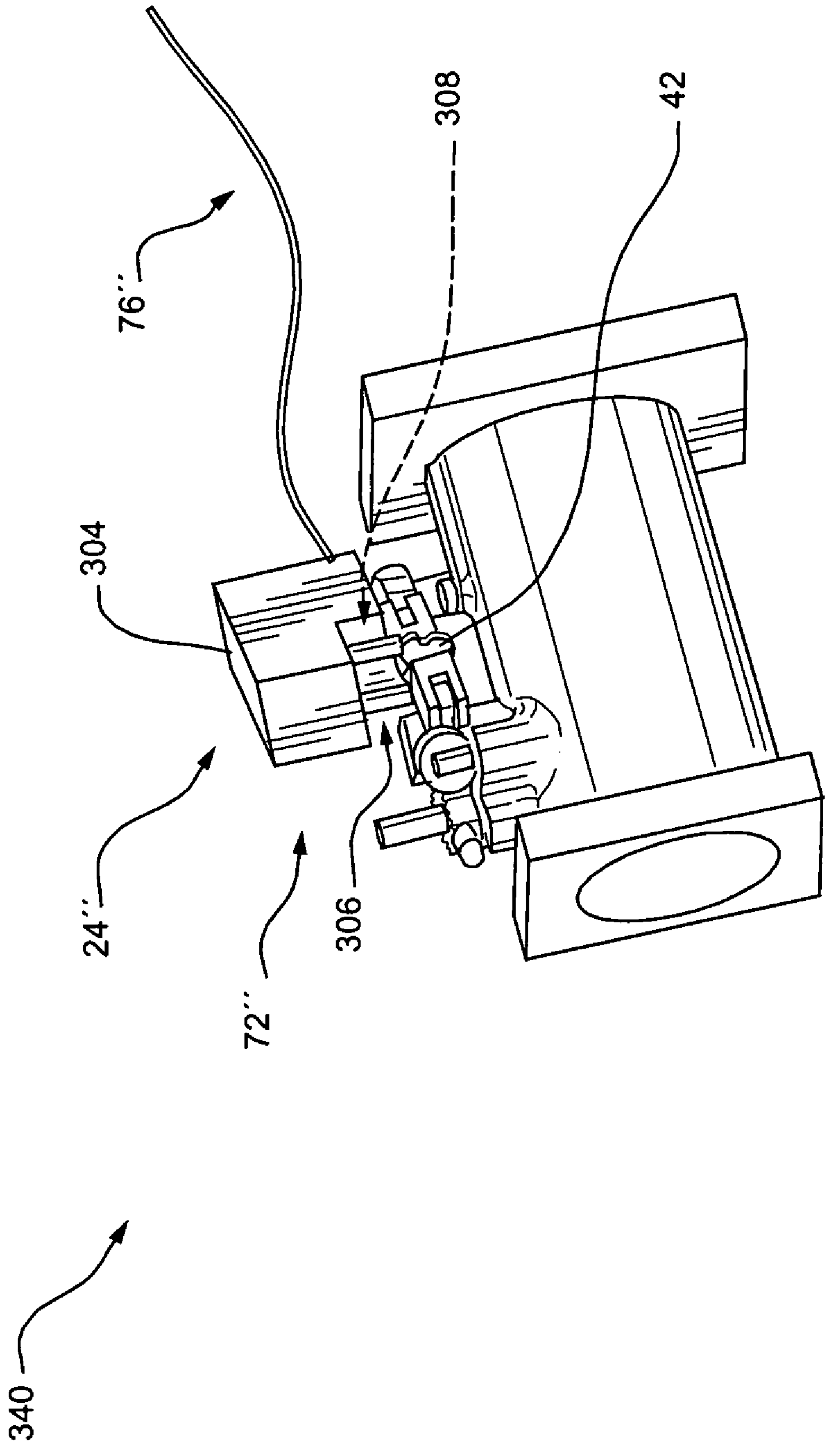
FIG. 8 is a detailed perspective view of a driver of the piston-based remote adjuster when attached to a thumb wheel.

FIG. 8 is a detailed perspective view 340 of the driver 72" of the piston-based remote adjuster 24" attached to the thumb wheel 42 of the mechanical linkage 34. As shown, a single piston member 308 which is moved by the set of actuators 306 strikes the thumb wheel 42 to incrementally impart a portion of a turn onto the thumb wheel 42. As a result, when the user actuates the controller 72" (e.g., electrical circuitry with a button or switch), the coupler 76" (e.g., a set of wires) conveys an electrical signal from the controller 72" to the actuator 72" to move the piston member 308. As a result, the piston member 308 pushes the thumb wheel 42 and thus partially rotates the thumb wheel 42 relative to the receiving screw 44.

Preferably, the set of actuators 306 includes at least two actuators 306, i.e., one actuator 306 which is configured to direct movement of the thumb wheel 42 in a first direction (e.g., clockwise) and another actuator 306 which is configured to direct movement of the thumb wheel 42 in the opposite direction (e.g., counterclockwise). Accordingly, the position of the actuators 306 is such that actuation of the actuators 306 enables the piston member 308 to properly engage with the thumb wheel 42 at each targeted indentation.

As explained above, an improved technique is directed to providing a remote adjustment to a portion 26 of an airplane engine 20 (e.g., a carburetor of an airplane combustion engine) which involves attaching a remote adjuster 24, 24', 24" to the portion 26 of the airplane engine 20 and providing a remote adjustment to the portion 26 using the remote adjuster 24, 24', 24" (e.g., a rotational adjustment of a thumb wheel 42 to modify a combustible mixture 30). Such a technique enables a user to reside at a safer distance (e.g., several feet) from the airplane engine 20 and other dangerously moving objects (e.g., a fast-moving propeller or similar load 32) while reliably adjusting the engine 20.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the engine 20 was described above as airplane combustion engine which drives a propeller. One of skill in the art should appreciate that the above-described remote adjuster driver 24, 24', 24" is well-suited for providing remote adjustments to other types of engines 20 as well such as other types of aircraft, watercraft, road vehicles, stationary machinery, and the like which have areas designed to receive direct manual adjustments but that reside in locations that are either dangerous or inconvenient to the user. The above-described remote adjuster 24, 24', 24" enables the user to reside at a distal location but nevertheless make effective adjustments.

Additionally, it should be understood that the remote adjuster 24, 24', 24" was described above as being configured to make an adjustment to the thumb wheel 42 to control positioning of a throttle 36. The remote adjuster 24, 24', 24" is well-suited for making other types of remote adjustments as well such as remote adjustments to thumb wheels controlling other mechanisms (e.g., oil pressure, idle speed, non-engine parts, etc.). Moreover, the driver 72, 72", 72" of the remote adjuster 24, 24', 24" is capable of being configured to interface with control members configured for direct manual adjustment other than thumb wheels such as thumb screws, wing nuts, levers, and the like.

Figure 9:
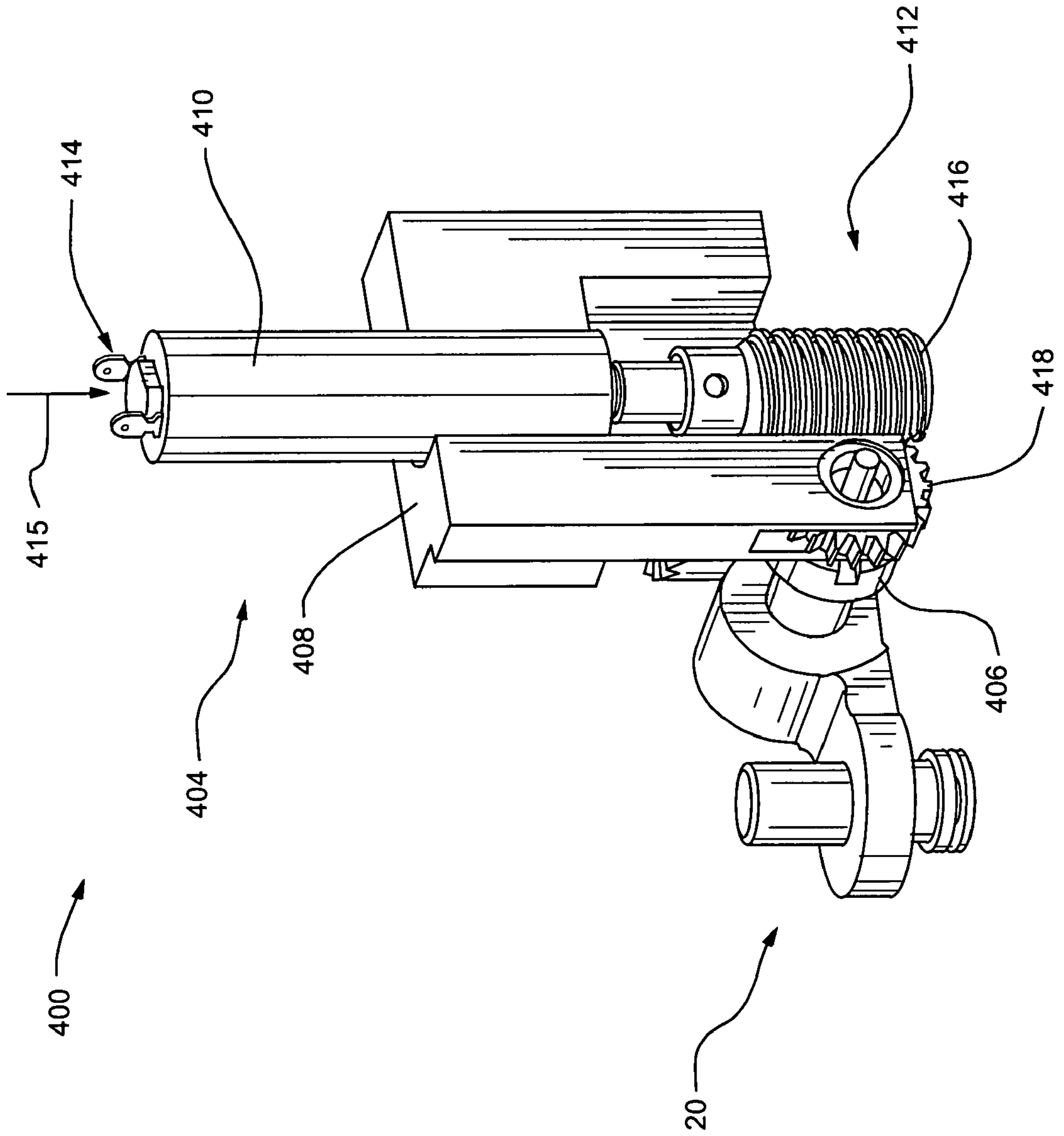
FIG. 9 is a detailed perspective view of a driver of another remote adjuster when attached to a set screw.
Figure 10:
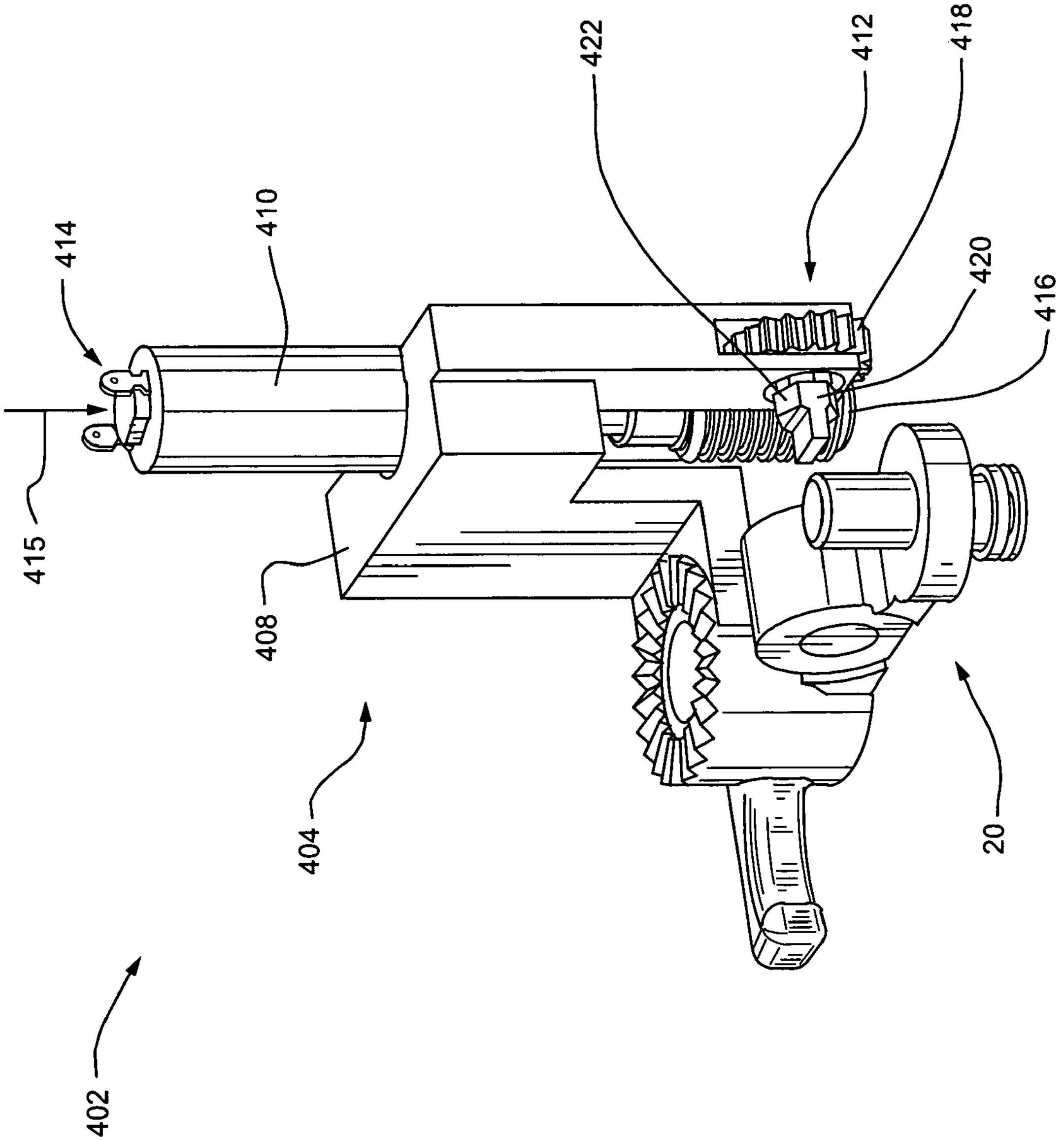
FIG. 10 is a detailed perspective view of the driver of FIG. 9 but from a reverse angle and with the set screw removed.

FIG. 9 is a perspective view 400 and FIG. 10 is a reverse-angle perspective view 402 of a driver 404 of another remote adjuster which is configured to remotely adjust a set screw 406 of an engine 20 also (see FIG. 1A). The set screw 406 is clearly shown in FIG. 9, but omitted in FIG. 10 to better illustrate details of the driver 404.

By way of example, the set screw 406 (also see the throttle adjusting screw 46 in FIG. 1B) controls an operating feature (e.g., the idle speed, the oil pressure, etc.) of the engine 20. The driver 404 is electronically actuated and thus is remotely operated by a controller through a coupler in a manner similar to that of the above-described piston-based remote adjuster 24" (e.g., see the controller 74" and the coupler 76" of FIGS. 8 and 9). Accordingly, a user can be positioned a safe distance from the engine 20 and the load driven by the engine 20.

As shown in FIGS. 9 and 10, the driver 404 includes a base 408, an electronic actuator 410 (e.g., a gear motor), and a worm gear assembly 412. The base 408 is configured to fasten to the engine 20 (e.g., the mechanical linkage 34 of FIG. 1B). The electronic actuator 410 has an electronic interface 414 (e.g., electric terminals) to receive user control signals 415 and thus drive the worm gear assembly 412 selectively in a forward direction or reverse direction. The worm gear assembly 412 includes an input member 416 (coupled to the actuator 410) and an output member 418 (coupled to the set screw 406) which work to provide gear reduction and rotation in either direction to the set screw 406.

As best seen in FIG. 10, the output member 418 defines an attachment interface 420 (e.g., a hex-shaped cavity, a chuck, etc.) to receive an attachment 422 (e.g., flat head screw driver bit). Other attachments 422 fit the attachment interface 420 as well such as a Phillips Head attachment, a hex-wrench attachment; an Allen-wrench attachment, and so on. In some arrangements, the output member 418 is spring loaded to push the attachment 422 into proper engagement (e.g., to provide sufficient insertion force on the set screw 406 to reliably engage the set screw 406). These arrangements enable the driver 404 to interface with a variety of control members for robust and reliable remote adjustment. Such modifications, enhancements and applications are intended to belong to various embodiments of the invention.

What is claimed is:

1. A method of providing a remote adjustment to a portion of an airplane engine, the method comprising:

attaching a remote adjuster to the portion of the airplane engine at a proximate location to the airplane engine while the airplane engine is not running, the portion being configured to receive a direct manual adjustment from a user while the airplane engine is running and while the user is in direct physical contact with the portion;

after attaching the remote adjuster to the portion of the airplane engine, supplying user input to the remote adjuster at a distal location to the airplane engine to provide a remote adjustment to the portion of the airplane engine through the remote adjuster in place of the direct manual adjustment from the user; and after supplying the user input to the remote adjuster, removing the remote adjuster from the portion of the airplane engine;

wherein the remote adjuster includes (i) a driver which is configured to come into direct physical contact with the portion of the airplane engine upon attachment of the remote adjuster to the portion of the airplane engine, (ii) a controller which is configured to receive the user input, and (iii) a coupler which links the controller to the driver to convey the user input from the controller to the driver;

wherein supplying the user input to the remote adjuster includes applying the user input to the controller to remotely adjust the portion of the airplane engine from an initial setting to a new setting through the driver and the coupler;

wherein the portion of the airplane engine includes a mechanical linkage;

wherein applying the user input to the controller to remotely adjust the portion of the airplane engine from the initial setting to the new setting includes changing a size of the mechanical linkage to tune operation of the airplane engine.

2. A method as in claim 1 wherein the mechanical linkage includes a compound screw having (i) a thumb wheel and (ii) a receiving screw configured to receive the thumb wheel, the compound screw defining different lengths in response to different threaded displacements between the thumb wheel and the receiving screw to control airplane engine fuel mixture; and wherein attaching the remote adjuster includes:

placing the driver in direct physical contact with the thumb wheel of the mechanical linkage.

3. A method as in claim 2 wherein the driver includes a pulley assembly and an flexible belt which is guided by the pulley assembly; and wherein placing the driver in direct physical contact with the thumb wheel includes:

fastening the pulley assembly to the receiving screw such that the flexible belt wraps around a section of the thumb wheel to provide more than a single point of contact between the flexible belt and the thumb wheel.

4. A method as in claim 3 wherein the controller includes a handle; wherein the coupler includes a cable which conveys axial motion of the handle to the pulley assembly to move the flexible belt through the pulley assembly; and wherein changing the size of the mechanical linkage includes:

turning the handle to effectuate translation of the flexible belt around the pulley assembly causing rotation of the thumb wheel relative to the receiving screw.

5. A method as in claim 2 wherein the driver includes a support assembly and a star wheel which is configured to rotate relative to the support assembly; and wherein placing the driver in direct physical contact with the thumb wheel includes:

fastening the support assembly to the receiving screw such that fingers of the star wheel respectively engage indentations of the thumb wheel in a gear-like manner.

6. A method as in claim 5 wherein the controller includes a handle; wherein the coupler includes a cable which conveys axial motion of the handle to the star wheel; and wherein changing the size of the mechanical linkage includes:

turning the handle to effectuate rotation of the star wheel through the cable causing rotation of the thumb wheel relative to the receiving screw.

7. A method as in claim 2 wherein the driver includes a support assembly and a actuator mounted to the support assembly, the actuator being configured to actuate relative to the support assembly; and wherein placing the driver in direct physical contact with the thumb wheel includes:

fastening the support assembly to the receiving screw such that actuation of the actuator moves the thumb wheel relative to the receiving screw.

8. A method as in claim 7 wherein the controller includes electronic circuitry; wherein the coupler includes a cable which conveys an electronic signal from the controller to the actuator; and wherein changing the size of the mechanical linkage includes:

directing the electronic circuitry to effectuate actuation of the actuator through the cable causing rotation of the thumb wheel relative to the receiving screw.

9. A remote adjuster to remotely adjust a portion of an airplane engine, the remote adjuster comprising:

a first operative end which is configured to attach to and detach from the portion of the airplane engine at a proximate location to the airplane engine while the airplane engine is not running, the portion being configured to receive a direct manual adjustment from a user while the airplane engine is running and while the user is in direct physical contact with the portion;

a second operative end which, while the airplane engine is running, is configured to obtain user input at a distal location to the airplane engine to provide a remote adjustment to the portion of the airplane engine through the first operative end in place of the direct manual adjustment from the user, the proximate location and the distal location being separated by at least two feet to enable a user to provide the user input at a relatively safe distance from the airplane engine;

a driver which forms the first operative end, the driver being configured to come into direct physical contact with the portion of the airplane engine upon attachment of the first operative end to the portion of the airplane engine;

a controller which forms the second operative end, the controller being configured to receive the user input; and a coupler which links the controller to the driver to convey the user input from the controller to the driver to remotely adjust the portion of the airplane engine from an initial setting to a new setting through the driver and the coupler wherein the portion of the airplane engine includes a mechanical linkage;

wherein remote adjustment of the portion of the airplane engine from the initial setting to the new setting by the remote adjuster involves a change in size of the mechanical linkage to tune operation of the airplane engine.

10. A remote adjuster as in claim 9 wherein the mechanical linkage includes a compound screw having (i) a thumb wheel and (ii) a receiving screw configured to receive the thumb wheel, the compound screw defining different lengths in response to different threaded displacements between the thumb wheel and the receiving screw to control airplane engine fuel mixture; and wherein the driver is configured to make direct physical contact with the thumb wheel of the mechanical linkage.

11. A remote adjuster as in claim 10 wherein the driver includes:

a pulley assembly and an flexible belt which is guided by the pulley assembly, the flexible belt being configured to wrap around a section of the thumb wheel to provide more than a single point of contact between the flexible belt and the thumb wheel when the driver makes direct physical contact with the thumb wheel of the mechanical linkage.

12. A remote adjuster as in claim 11 wherein the controller includes a handle; wherein the coupler includes a cable which conveys axial motion of the handle to the pulley assembly to move the flexible belt through the pulley assembly; and wherein turning the handle is configured to effectuate translation of the flexible belt around the pulley assembly causing rotation of the thumb wheel relative to the receiving screw.

13. A remote adjuster as in claim 10 wherein the driver includes:

a support assembly and a star wheel which is configured to rotate relative to the support assembly, fingers of the star wheel being configured to respectively engage indentations of the thumb wheel in a gear-like manner.

14. A remote adjuster as in claim 13 wherein the controller includes a handle; wherein the coupler includes a cable which conveys axial motion of the handle to the star wheel; and wherein turning the handle is configured to effectuate rotation of the star wheel through the cable causing rotation of the thumb wheel relative to the receiving screw.

15. A remote adjuster as in claim 10 wherein the driver includes:

a support assembly and an actuator mounted to the support assembly, the actuator being configured to actuate relative to the support assembly to move the thumb wheel relative to the receiving screw.

16. A remote adjuster as in claim 15 wherein the controller includes electronic circuitry; wherein the coupler includes a cable which conveys an electronic signal from the controller to the actuator; and wherein the operation of the electronic circuitry is configured to effectuate actuation of the actuator through the cable causing rotation of the thumb wheel relative to the receiving screw.

17. A method as in claim 1 wherein the mechanical linkage includes a set screw defining different lengths in response to different threaded displacements to control idle speed of the airplane engine; and wherein attaching the remote adjuster includes:

placing the driver in direct physical contact with the set screw of the mechanical linkage.

18. A method as in claim 1 wherein the mechanical linkage includes an oil pressure adjusting member configured to receive direct manual adjustment from a user's hand to control oil pressure of the airplane engine; and wherein attaching the remote adjuster includes:

placing the driver in direct physical contact with the oil pressure adjusting member of the mechanical linkage.

19. A remote adjuster as in claim 9 wherein the mechanical linkage includes a set screw defining different lengths in response to different threaded displacements to control idle speed of the airplane engine; and wherein the driver is configured to make direct physical contact with the set screw of the mechanical linkage.

20. A remote adjuster as in claim 9 wherein the mechanical linkage includes an oil pressure adjusting member configured to receive direct manual adjustment from a user's hand to control oil pressure of the airplane engine; and wherein the driver is configured to make direct physical contact with the oil pressure adjusting member of the mechanical linkage.

* * * * *

UNITED STATES PATENT AND TRADEMARK OFFICE

CERTIFICATE OF CORRECTION

PATENT NO. : 7,788,013 B2
APPLICATION NO. : 11/480612
DATED : August 31, 2010
INVENTOR(S) : Anthony Stanley Pruszenski It is certified that error appears in the above-identified patent and that said Letters Patent is hereby corrected as shown below:

Title Page, Item (56)
Under the heading “References Cited, U.S. PATENT DOCUMENTS,” reference number 3,784,174 A, “Tamofsky” should be changed to read “Tarnofsky”

Signed and Sealed this

Nineteenth Day of October, 2010

David J. Kappos
*Director of the United States Patent and Trademark Office*